Jan. 29, 1935. LA VERNE C. LUBCKE 1,989,238
CIRCUIT CLOSER FOR SIGNALS
Filed Aug. 27, 1932
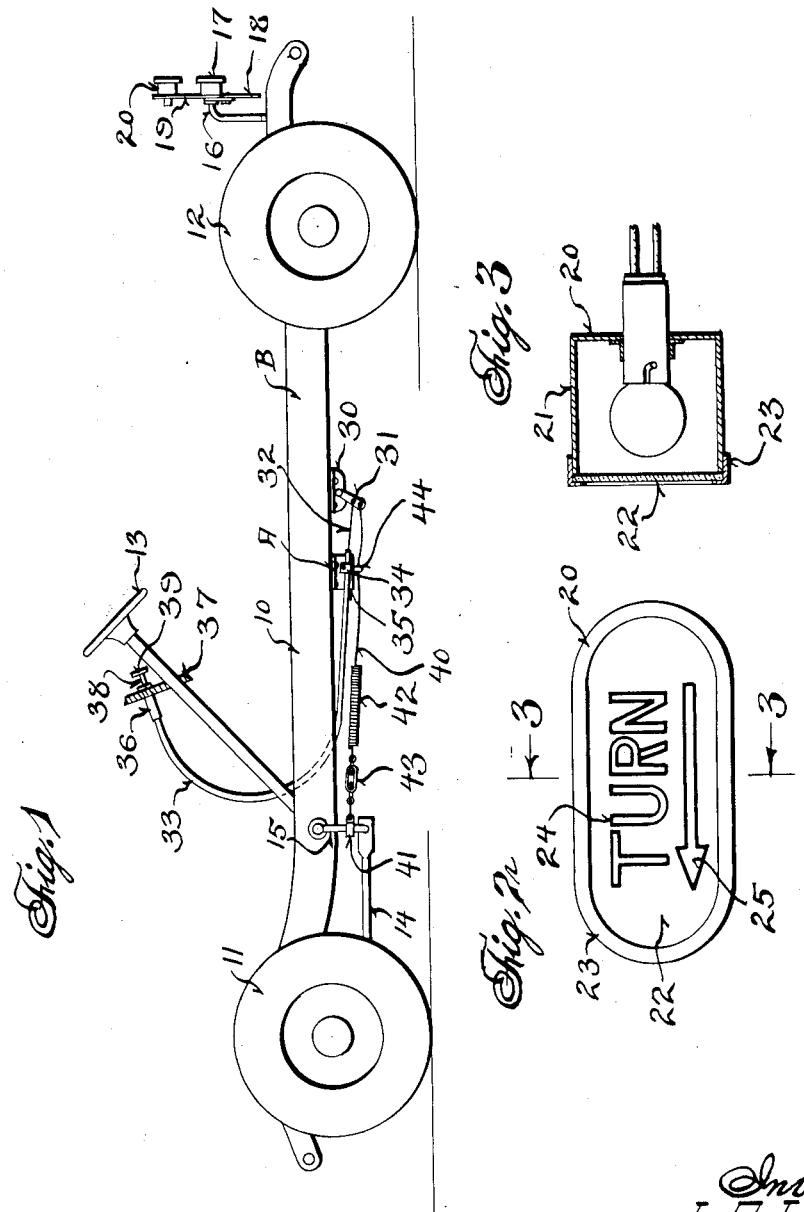
Inventor
L. C. Lubcke
By
Attorneys Patented Jan. 29, 1935

1,989,238

UNITED STATES PATENT OFFICE 1,989,238

CIRCUIT CLOSER FOR SIGNALS

La Verne C. Lubcke, Watertown, Wis.

Application August 27, 1932, Serial No. 630,688

1 Claim. (Cl. 200—59)

This invention appertains to attachments for motor vehicles and more particularly to a novel circuit closer for a direction indicator for automobiles.

Considerable difficulty is experienced by the operators of automobiles for indicating left-hand turns to following traffic and the general practice for the driver of the vehicle is to remove his hand from the steering wheel and to protrude the same out of the vehicle. This method of signalling is rendered more difficult in cold or rainy weather due to the fact that the window adjacent to the driver is generally closed during such weather.

It is therefore one of the primary objects of my invention to provide an electric device, which will be clearly visible to the following traffic for indicating to such traffic the intended change of course of the vehicle, said device only necessitating the momentary removal of one hand of the driver of the vehicle from the steering wheel.

Another salient object of my invention is to provide an indicating lamp on the vehicle with novel means for closing the circuit through the lamp when a left-hand turn is being made with automatic means for opening the circuit after the turn has been accomplished.

A further important object of my invention is the provision of a device for indicating, when a left-hand turn is to be made, embodying a novel switch for closing a circuit through a signal lamp mounted on the vehicle with manual means arranged adjacent to the steering wheel of the vehicle for moving the switch to a circuit closing position and automatic means for returning the switch and the manual operating means to a normal position after the left-hand turn has been accomplished.

A still further object of my invention is to provide a left-hand turning signal for motor vehicles of the above character, which will be durable and efficient in use, one that will be simple and easy to manufacture and one which can be placed upon the market and incorporated with a conventional automobile at a low cost.

With these and other objects in view, the invention consists in the novel construction, arrangement and formation of parts, as will be hereinafter more specifically described, claimed and illustrated in the accompanying drawing, in which:

Figure 1 is a side elevation of a chassis of an automobile showing my improved direction signal incorporated therewith.

Figure 2 is an elevation of the signal lamp or casing.

Figure 3 is a transverse section through the signal lamp or casing taken on the line 3—3 of Figure 2 looking in the direction of the arrows.

Referring to the drawing in detail, wherein similar reference characters designate the corresponding parts throughout the several views, the letter A generally indicates my improved left-hand signalling device incorporated with an automobile B.

The automobile B may be of any preferred character or make either of the pleasure or commercial type and the same includes the usual frame 10 having the front steering wheels 11 and rear traction wheels 12. The usual steering wheel 13 is provided for operating the front wheels 11 and any desired type of steering gear 14 is employed. As shown, the steering gear 14 includes the swinging steering arm 15. The rear end of the frame 10 has connected therewith a bracket 16 for supporting the tail and stop light 17 and license plate 18.

In accordance with my invention, I connect with the bracket 16, by the use of a suitable supporting plate 19, a second indicating light 20. This light 20 can be of any desired form and is employed for indicating to traffic the intended change in course of the vehicle. As shown, the light 20 includes a casing 21 having connected thereto a color translucent plate 22 by the use of a suitable retaining frame 23. The plate 22 can have formed thereon the word "turn" as indicated by the reference character 24 and an arrow 25 pointing in a left-hand direction. My improved device A comprises a switch 30 which is preferably secured to the chassis or frame 10 of the vehicle at a point adjacent to the steering gear of the vehicle. This switch 30 can be of any desired character and embodies a swinging switch lever 31. Connected to the switch lever 31 is a flexible but relatively stiff wire 32. This wire 32 is extended through a flexible tubular casing 33. The lower end of the casing 33 is connected by a clamp 34 to a supporting bracket 35. The supporting bracket 35 can be bolted or otherwise secured to the frame of the vehicle. The upper end of the flexible casing 33 and the wire 32 can be disposed at any preferred point adjacent to the steering wheel 13. If desired, the casing 33 can be connected by means of a clamp to the steering column or as shown, this casing 33 can be connected by means of a sleeve 36 to the instrument panel 37 of the vehicle. Connected to the wire 32 and slidably mounted in the sleeve 36 is a plunger rod 38 having a handle or finger grip 39 formed thereon.

Leading from the switch lever 31 is a relatively stiff wire 40 which is connected by means of a clamp 41 to the steering arm 15 of the vehicle steering gear. A contractile spring 42 and a turnbuckle 43 can be interposed in the length of the said wire 40. If desired, a guide-eye 44 can be connected to the bracket 35 for the wire 40.

The electric bulb for the signal light is connected by any conventional type of wiring with the switch and storage battery of the vehicle and I prefer to derive the electric energy from the vehicle ammeter connections. Obviously during the swinging movement of the switch lever 31, the circuit through the bulb will be open or closed.

In operation of my improved device, when it is desired to make a left-hand turn and to close the circuit through the signal light, the plunger rod 38 is pushed inwardly. This will swing the switch lever 31 rearwardly by the stiff rod 32 and the switch lever will be moved to a circuit closing position. I preferably form a slack in the wire 40 and the rearward swinging movement of the switch lever will take up this slack in the wire.

The circuit through the bulb will remain closed until the vehicle has made its left-hand turn and when the steering wheel 13 has been rotated to the left, the steering arm 15 will exert a pull on the wire 40 returning the switch lever 31 to its normal position. The forward movement of the switch lever 31 will also force the stiff wire 32 through its casing 33 and move the handle 39 and the plunger rod 38 to its normal position.

In case the switch lever should not be returned automatically to its normal position for opening the circuit, it will be merely necessary to pull out on the plunger rod 38.

The spring 42 allows a certain amount of resiliency in the length of the wire 40 and takes care of extreme swinging movement of the steering arm 15. The turnbuckle 43 is employed for adjusting the active length of the said wire 40.

From the foregoing description, it can be seen that I have provided an exceptionally simple device, which can be placed upon the market and incorporate with a vehicle at a very low cost. The device is also of such a character as to permit the attachment thereof to a standard vehicle by an ordinary layman and suitable instructions will be printed and sold with each signal for indicating the best method for attaching the same to different makes of automobiles and the method of initial adjustment of the parts.

I am familiar with the fact that a number of patents have been granted on electric signalling devices for automobiles, but all of these devices, of which I have knowledge, are of a highly complicated order and have not been practical for commercial purposes.

Changes in details may be made without departing from the spirit or the scope of this invention, but what I claim as new is:

I claim:

In a signal for motor vehicles, an electric switch for controlling the circuit through an electric signalling device, said switch including a switch lever, manual means for moving the lever to a circuit closing position including a stiff operating wire, means slidably supported and guiding the wire, means connecting one end of the wire to the switch lever, an end plunger connected to the other end of the wire and disposed adjacent to the steering wheel of the vehicle, a second wire secured to the switch lever and to the steering arm of the steering gear of the vehicle, and a contractile coil spring interposed in the length of the last mentioned wire, said last mentioned wire normally having a slack therein, movement of the plunger and first wire for actuating the switch lever to a circuit closing position being sufficient to take up said slack, whereby upon movement of the steering gear the lever, the first wire and plunger will be returned to normally circuit open position.

LA VERNE C. LUBCKE.